US012561964B2

(12) United States Patent
Yoo et al.

(10) Patent No.: US 12,561,964 B2
(45) Date of Patent: Feb. 24, 2026

(54) METHOD AND SYSTEM FOR DETECTING AND CLASSIFYING OBJECTS OF IMAGE

(71) Applicant: KOREA ADVANCED INSTITUTE OF SCIENCE AND TECHNOLOGY, Daejeon (KR)

(72) Inventors: Changdong Yoo, Daejeon (KR); Thang Vu, Daejeon (KR); Xuan Trung Pham, Daejeon (KR); Hyunjun Jang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 343 days.

(21) Appl. No.: 18/023,506

(22) PCT Filed: Sep. 15, 2020

(86) PCT No.: PCT/KR2020/012450
§ 371 (c)(1),
(2) Date: Feb. 27, 2023

(87) PCT Pub. No.: WO2022/045429
PCT Pub. Date: Mar. 3, 2022

(65) Prior Publication Data
US 2023/0316737 A1 Oct. 5, 2023

(30) Foreign Application Priority Data
Aug. 25, 2020 (KR) ........................ 10-2020-0107359

(51) Int. Cl.
*G06V 10/82* (2022.01)
*G06V 10/776* (2022.01)
(52) U.S. Cl.
CPC ............ *G06V 10/82* (2022.01); *G06V 10/776* (2022.01)

(58) Field of Classification Search
CPC ............ G06N 3/04; G06N 3/045; G06N 3/08; G06V 10/25; G06V 10/776; G06V 10/82
See application file for complete search history.

(56) References Cited

U.S. PATENT DOCUMENTS 10,482,603 B1* 11/2019 Fu ............................ G06N 3/09
10,579,897 B2* 3/2020 Redmon ................ G06V 20/35
(Continued)

FOREIGN PATENT DOCUMENTS

KR 20180065856 A 6/2018

OTHER PUBLICATIONS

Yu Peng Chen et al. , "An Enhanced Region Proposal Network for object detection using deep learning method," Sep. 20, 2018, PLoS ONE, 13(9): e0203897, pp. 1-15.*
(Continued)

*Primary Examiner* — Omar S Ismail
(74) *Attorney, Agent, or Firm* — Scully, Scott, Murphy & Presser, P.C.

(57) ABSTRACT

The present invention provides a method comprising the steps of: generating a second anchor on the second convolutional feature map by scaling and shifting a first anchor in the ground-truth box; generating a third convolutional feature map by convolving the second convolutional feature map by means of a second convolution; determining whether the overlap ratio between the ground-truth box and a second single anchor is greater than or equal to a reference value; generating a third anchor by scaling and shifting the second anchor having an overlap ratio that is greater than or equal to the reference value; assigning an objectivity score to the third anchor; and presenting the third anchor, which has an objectivity score that is equal to or greater than a reference value, as a proposal on the third convolutional feature map.

11 Claims, 8 Drawing Sheets

(56)         References Cited

U.S. PATENT DOCUMENTS

| | | | | |
|---|---|---|---|---|
| 10,713,794 | B1 * | 7/2020 | He | G06V 10/25 |
| 11,354,577 | B2 * | 6/2022 | Ren | G06N 3/045 |
| 2017/0206431 | A1 * | 7/2017 | Sun | G06F 18/24 |
| 2019/0012802 | A1 * | 1/2019 | Liu | G06V 30/2504 |
| 2019/0228215 | A1 * | 7/2019 | Najafirad | G06F 3/013 |
| 2019/0258878 | A1 * | 8/2019 | Koivisto | G05D 1/00 |
| 2020/0302297 | A1 * | 9/2020 | Jaganathan | G06F 16/58 |
| 2021/0056351 | A1 * | 2/2021 | Peng | G06V 10/764 |
| 2021/0142097 | A1 * | 5/2021 | Zheng | G06N 3/0464 |
| 2021/0326656 | A1 * | 10/2021 | Lee | G06F 18/217 |
| 2022/0147753 | A1 * | 5/2022 | Fang | G06V 10/28 |
| 2022/0156554 | A1 * | 5/2022 | Fu | G06N 3/0495 |

OTHER PUBLICATIONS

Fukoeng Wong et al.,"Adaptive learning feature pyramid for object detection ," Dec. 6, 2019, IET Computer Vision, vol. 13, Issue 8,pp. 742-746.*

Thang Vu et al.,"Cascade RPN: Delving into High-Quality Region Proposal Network with Adaptive Convolution," Dec. 4, 2019, 33rd Conference on Neural Information Processing Systems (NeurIPS 2019), Vancouver, Canada,pp. 1-9.*

Yuelei Xu et al.,"End-to-End Airport Detection in Remote Sensing Images Combining Cascade Region Proposal Networks and Multi-Threshold Detection Networks," Sep. 21, 2018, Remote Sens. 2018, 10, 1516,pp. 1-15.*

Wei Guo et al.,"Extended Feature Pyramid Network with Adaptive Scale Training Strategy and Anchors for Object Detection in Aerial Images," Mar. 1, 2020, Remote Sens. 2020, 12, 784,pp. 1-20.*

Yanjie Wang et al.,"Multi-scale dilated convolution of convolutional neural network for crowd counting," Oct. 17, 2019, Multimedia Tools and Applications (2020) 79,pp. 1-7.*

Xiaotong Zhao et al.,"Aggregated Residual Dilation-Based Feature Pyramid Network for Object Detection," Sep. 27, 2019, IEEE Access vol. 7,2019, pp. 134014-134024.*

Fan, H., et al., "Siamese Cascaded Region Proposal Networks for Real-Time Visual Tracking", 2019 IEEE/CVF Conference on Computer Vision and Pattern Recognition (CVPR), Jan. 9, 2020, pp. 7952-7961.

Xu, Y., et al., "End-to-End Airport Detection in Remote Sensing Images Combining Cascade Region Proposal Networks and Multi-Threshold Detection Networks", Remote Sens. 2018, Received Aug. 8, 2018, Accepted Sep. 12, 2018, Published Sep. 21, 2018, pp. 1-17, 10, 1516.

Vu, T., et al., "Cascade RPN: Delving into High-Quality Region Proposal Network with Adaptive Convolution", arXiv:1909.06720v1 [cs.CV], Sep. 15, 2019, 12 pages.

International Search Report dated May 13, 2021 issued in PCT/KR2020/012450, 4 pages.

* cited by examiner

300

302

304

306

400

408

RPN image input    Deep CNN    convolutional feature map    convolutional feature map with object proposal    proposal classifier    412

402    404    406    410 image having categorized object    414

| | |
|---|---|
| inputting image | ~802 |
| generating convolutional feature map | ~804 |
| generating proposal on convolutional feature map | ~806 |
| classifying object on proposal and assigning score | ~808 |
| classifying and/or outputting image along with score | ~810 |

METHOD AND SYSTEM FOR DETECTING AND CLASSIFYING OBJECTS OF IMAGE

BACKGROUND

Field

The present disclosure relates to a method and system for detecting and classifying objects of image by proposing at least one bounding box corresponding to at least one object on a test image using a CNN (Convolutional Neural Network).

Related Art

In machine learning, CNN (Convolutional Neural Network) is a type of artificial neural network successfully applied in the field of visual image analysis.

As search engine capabilities improve, users are demanding faster and more powerful searches. As camera technology and search capabilities improve, image search is becoming increasingly common. Typically, object detection in image search is performed using a convolutional neural network. In some models, to increase the accuracy of object detection, the convolutional neural network is pairwise coupled with a selective search to generate a proposal image.

Recently, an object detection function applied to autonomous driving, robotics, and surveillance is receiving attention. Given an image, an object detector aims to detect known object instances, and each object is assigned a bounding box and a class label. Recent high-performance object detectors, such as Faster R-CNN, perform detection problems in a two-stage pipeline. In the first step, a region proposal network (RPN) refines and organizes anchor sets to generate a sparse set of proposal boxes, and in the second step, a region-specific CNN detector (R-CNN) refines and classifies the proposals generated by the RPN. However, compared to the R-CNN, the RPN is relatively less interested in performance improvement.

SUMMARY

The present disclosure aims to improve RPN by addressing limitations arising from empirically defining anchors and aligning functions to the anchors.

The present disclosure includes a system, method and computer-readable media for faster and more accurate object detection and classification in an image. In some configurations, a computer device may receive an image.

An embodiment of the present disclosure provides a method including: receiving an input image and generating a first convolutional feature map; converting the first convolutional feature map into a second convolutional feature map by a first convolution; generating a first anchor for each point of the input image; determining whether the first anchor is within a ground truth box; generating a second anchor on the second convolutional feature map by scaling and shifting the first anchor within the ground truth box; generating a third convolutional feature map by convolving the second convolutional feature map by a second convolution; determining whether an overlap ratio between the ground truth box and the second single anchor is greater than or equal to a reference value; generating a third anchor by scaling and shifting the second anchor having an overlap ratio greater than or equal to the reference value; assigning an objectness score to the third anchor; and proposing the third anchor having an objectness score equal to or greater than a reference value as a proposal on the third convolutional feature map.

The embodiment of the present disclosure further includes generating a fourth convolutional feature map by convolving the third convolutional feature map by a third convolution; determining whether an overlapping ratio between the ground truth box and the third single anchor is greater than or equal to a reference value; generating a fourth anchor by scaling and shifting the third anchor having the overlapping ratio greater than or equal to the reference value; assigning an objectness score to the fourth anchor; and proposing the fourth anchor having the objectness score equal to or greater than a reference value as a proposal on the fourth convolutional feature map.

The embodiment of the present disclosure further includes: determining a category of the candidate object; and assigning a confidence score to the category of the candidate object.

An embodiment of the present disclosure provides a system including: a processor; and a computer-readable medium including instructions for executing an object detection and classification network by the processor, wherein the object detection and classification network includes an initial processing module configured to input an image and generate a convolutional feature map, and an object proposal module configured to generate a proposal corresponding to a candidate object in the image, and wherein the object proposal module performs: converting a first convolutional feature map into a second convolutional feature map by a first convolution; generating a first anchor for each point of the input image; determining whether the first anchor is within a ground truth box; generating a second anchor on the second convolutional feature map by scaling and shifting the first anchor within the ground truth box; generating a third convolutional feature map by convolving the second convolutional feature map by a second convolution; determining whether an overlap ratio between the ground truth box and the second single anchor is greater than or equal to a reference value; generating a third anchor by scaling and shifting the second anchor having an overlap ratio greater than or equal to the reference value; assigning an objectness score to the third anchor; and proposing the third anchor having an objectness score equal to or greater than a reference value as a proposal on the third convolutional feature map.

In the embodiment of the present disclosure, the object proposal module performs: generating a fourth convolutional feature map by convolving the third convolutional feature map by a third convolution; determining whether an overlapping ratio between the ground truth box and the third single anchor is greater than or equal to a reference value; generating a fourth anchor by scaling and shifting the third anchor having the overlapping ratio greater than or equal to the reference value; assigning an objectness score to the fourth anchor; and proposing the fourth anchor having the objectness score equal to or greater than a reference value as a proposal on the fourth convolutional feature map.

The embodiment of the present disclosure further includes a proposal classifier for determining a category of the candidate object and assigning a confidence score to the category of the candidate object.

The embodiment of the present disclosure further includes a machine learning module for training at least one parameter of the initial processing module and the object proposal module to generate at least one proposal on a training image, and training at least one parameter of the proposal classifier module to assign a category to each of the at least one proposal on the training image.

According to the present disclosure, the following effects can be obtained.

According to the present disclosure, a bounding box corresponding to an object on an image can be obtained with high accuracy.

In addition, the present disclosure can propose an anchor while maintaining the alignment rule of the regressed box and the convolutional feature map.

Moreover, the present disclosure can reduce the number of anchor boxes by using one anchor for each point, thereby increasing the speed of the neural network and the accuracy of object recognition.

BRIEF DESCRIPTION OF THE DRAWINGS

FIG. 5 is an exemplary diagram of a general region proposal network used in the object detection and classification network shown in FIGS. 1 and 2.

DESCRIPTION OF EXEMPLARY EMBODIMENTS

Figure 1:
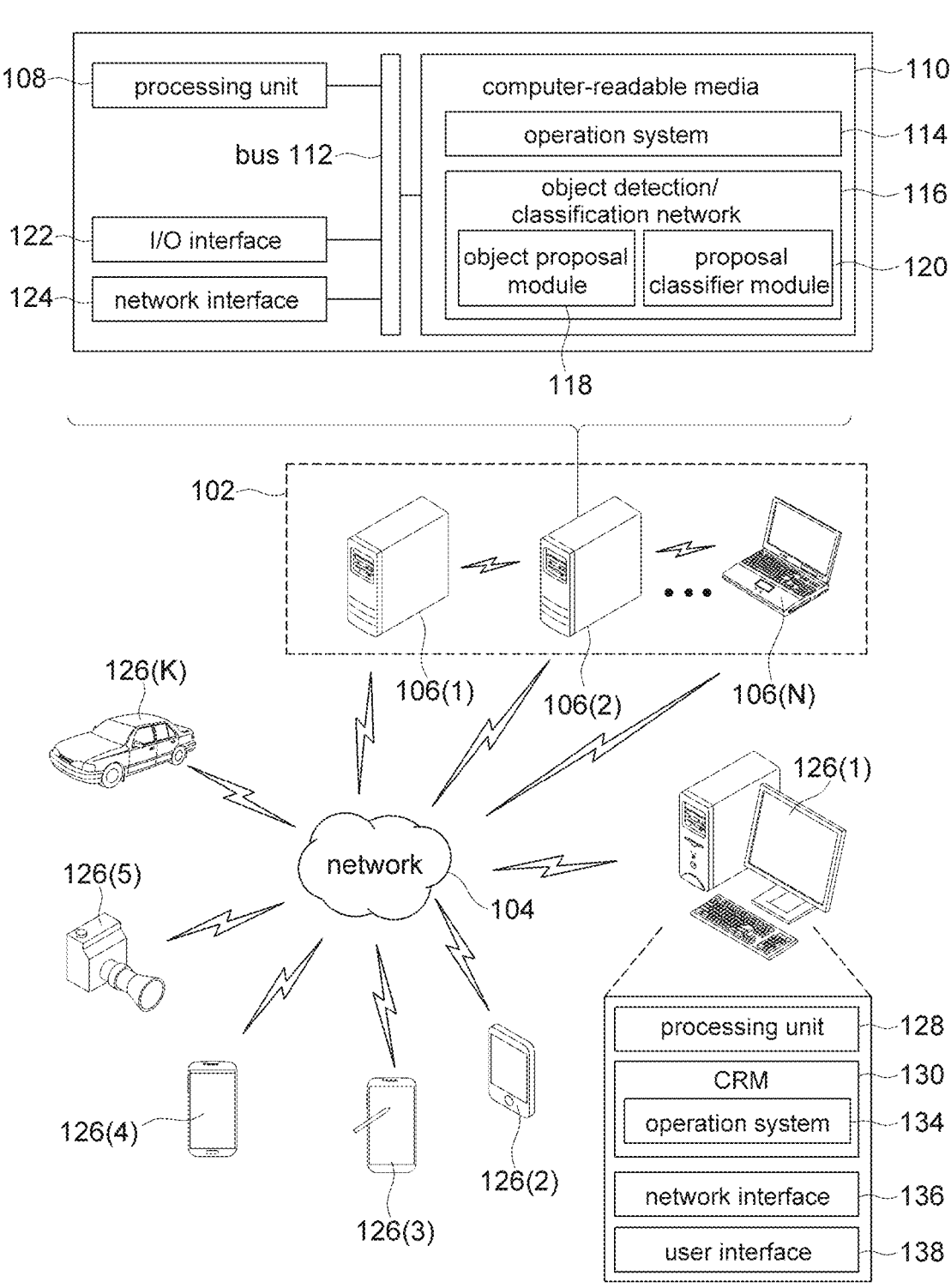
FIG. 1 is a block diagram illustrating an exemplary environment in which an object detection and classification network may operate.

Advantages and features of the present disclosure, and methods for achieving them, will become apparent with reference to the following embodiments described in detail in conjunction with the accompanying drawings. However, the present disclosure is not limited to the embodiments disclosed below and may be implemented in various different forms. The embodiments are provided only to complete the present disclosure and to allow those skilled in the art to which the present disclosure pertains to fully understand the scope of the present disclosure, and the present disclosure is defined only by the scope of the claims. Thus, in some embodiments, well-known technologies will not described in detail to avoid obscuring the interpretation of the present disclosure. Like reference numerals designate like components throughout the present specification.

Unless otherwise defined, all terms (including technical and scientific terms) used in the present specification may be used in a meaning that is commonly understood by those skilled in the art to which the present disclosure pertains. In addition, terms defined in commonly used dictionaries are not interpreted ideally or excessively unless explicitly specifically defined.

For example, the term "technology or technique" may refer to operations permitted by systems, methods, computer-readable instructions, modules, algorithms, hardware logic, and/or the context described above throughout the present specification. In addition, the terms "class", "category", "type" and "group" of objects in an image may be considered synonymous with respect to the classification of objects.

A computer device may process images and generate a convolutional feature map. In some configurations, the convolutional feature map may be processed through a region proposal network (RPN) to generate proposal candidate positions of objects in an image.

The computer device may process the convolutional feature map with the proposal candidate positions through a proposal classifier and determine which objects are present in the image. The technologies and techniques described herein may apply fast region-based convolutional neural network (FRCN) to determine the classification (e.g., type, class, group, category, etc.) of each region and its associated confidence score. Classification (e.g., how accurately the system believes the classification), and outputs including object classification and/or confidence scores may be provided to a requestor.

Exemplary technologies described herein may apply machine learning to train a model with training images to provide fast and accurate object detection and classification in images. In some configurations, a multi-step machine learning process may be implemented to train the object detection and classification system. In some configurations, a single step machine learning process may be implemented to train the object detection and classification system.

The present disclosure described herein provides techniques and configurations for improving object detection and classification in images. In some embodiments, a computer system may receive images. The computer system may sequentially process an image through multiple layers of a deep convolutional neural network (Deep CNN) and generate a convolutional feature map.

In various embodiments of the present disclosure, the computer system may input a convolutional feature map into a region proposal network (RPN). In such embodiments, the region proposal network may evaluate the convolutional feature map and generate proposals (e.g., object candidate positions) on the convolutional feature map. In some embodiments, the proposal may be in the form of a bounding box. For example, a region proposal network may generate rectangular bounding boxes around potential objects (e.g., objects that are unlikely to be objects in the image) on the convolutional feature map.

In various embodiments, the computer system may input the convolutional feature map along with the proposals into the FRCN to determine the classification (e.g., type, class, group, category, etc.) of each potential object. In some embodiments, the fast region-based convolutional neural network (FRCN) may determine that the class of an object matches one of a predetermined number of object classes and label the object accordingly. Conversely, the fast region-based convolutional neural network (FRCN) may determine that the class of an object does not match one of a predetermined number of object classes and label the object as a background.

In some embodiments, the fast region-based convolutional neural network (FRCN) may evaluate the classification label assigned to each object in the image (e.g., how accurately the system believes the classification) and assign a confidence score to the classification. Output including object classification and/or confidence scores may be provided to a requestor.

In addition, the computer systems may provide accurate object detection and classification by applying a machine learning to train a model with a training image. In various embodiments, the machine learning training process may include multiple training steps. In some embodiments, the machine learning training process may include a single training step.

The operating system described below constitutes one embodiment and is not intended to limit the scope of the claims to any one specific operating environment. It may be used in other environments without departing from the technical idea and scope of the claimed subject matter.

FIG. 1 is a block diagram illustrating an exemplary environment 100 in which an object detection and classification network may operate. In some examples, various devices and/or components of the environment 100 may include a distributed computer resource 102 that can communicate with each other and with external devices via one or more networks 104.

For example, the networks 104 may include public networks such as the Internet, private networks such as institutional and/or private intranets, or combination of some of private and public networks. The networks 104 include a local area network (LAN), a wide area network (WAN), a satellite network, a cable network, a Wi-Fi network, a WiMax network, but it may include any type of wired and/or wireless network which are not limited thereto. Mobile communications network (e.g., 3G, 4G, 5G, etc.) or any combination thereof. The network 104 may utilize a communications protocol including a packet-based protocol and/or a datagram-based protocol, such as internet protocol (IP), transmission control protocol (TCP), user datagram protocol (UDP), or another type of protocol. Moreover, the network 104 may include a plurality of devices that facilitate network communications or configure the hardware basis for the network, such as switches, routers, gateways, access points, firewalls, base stations, repeaters, and backbone devices.

In some embodiments, the network 104 may further include devices that enable connection to a wireless network, such as a wireless access point (WAP). Embodiments according to the present disclosure may include a WAP that supports the IEEE (Institute of Electrical and Electronics Engineers) 802.11 standards (e.g., 802.11g, 802.11n, etc.) and support a connection through the WAP that transmits and receives data through various electromagnetic frequencies (e.g., radio frequencies).

In various embodiments, the distributed computer resource 102 may include devices 106(1) to 106(N). Embodiments of the present disclosure support scenarios in which the devices 106 may operate in a cluster or other grouped configuration to share resources, distribute load, increase performance, or include one or more computer devices for other purposes. The devices 106 may fall into various categories such as conventional server-type devices, desktop computer-type devices, mobile devices, special purpose devices, embedded devices, and/or wearable devices. Accordingly, although described as desktop and laptop computers, the devices 106 may include various types of devices and are not limited to a specific type of device. The devices 106 may be integrated components to be included in a desktop computer, a server computer, a web server computer, a personal computer, a mobile computer, a laptop computer, a tablet computers, a wearable computer, an implantable computer device, a communication device, an automobile computer, a network-enabled television, a thin client, a terminal, a PDA, a game console, a gaming device, a workstation, a media player, a personal video recorders (PVR), a set-top box, a camera, and a computer device.

The devices 106 may include any type of computer device having one or more processing units 108 operatively linked to computer-readable media (CRM) 110 via a bus 112, and in some cases, include one or more of them. The bus 112 may include system bus, data bus, address bus, PCI bus, mini PCI bus, and various local, peripheral devices and/or independent bus.

Executable instructions stored in the CRM 110 may include, for example, an operating system 114, an object detection and classification network 116, an object proposal module 118, a proposal classifier module 120, and other modules, programs or applications which are loadable and executable by the processing unit 108. Additionally, what is functionally described herein may be performed at least partially by one or more hardware logic components, such as an accelerator. For example, example types of hardware logic components that may be used include field-programmable gate arrays (FPGAs), application-specific integrated circuits (ASICs), application-specific standard products (APS), system-on-a-chip (SOC) systems, complex programmable logic devices (CPLDs), and the like.

The device 106 includes one or more input/output (I/O) interfaces 122 which enable the devices 106 to communicate with a peripheral input device (e.g., a keyboard, a mouse, a pen, a game controller, a voice input device, a touch input device, a gesture input device, etc.) and/or a peripheral output device (e.g., a display, a printer, etc.). For convenience, other components have been omitted from the illustrated devices 106.

The devices 106 may include one or more input/output (I/O) interfaces 122 which enable the devices 106 to communicate with other network devices, such as a consumer's computer device 126 through which a consumer can input (e.g., query image, request image, etc.). The input/output (I/O) interface 122 may include one or more network interface controllers (NICs) or other types of transceiver devices for transmitting and receiving communications over a network.

Other devices involved in object detection and classification optimization may include consumer computer devices 126(1) to 126(N). The consumer computer devices 126 may fall into various categories such as consumer-type devices, desktop computer-type devices, mobile devices, special purpose devices, embedded devices, and/or wearable devices. Accordingly, although depicted as a mobile computer device that may have fewer computer resources than the devices 106, the consumer computer devices 126 may include various types of devices and are not limited to a specific type of device.

The consumer computer devices 126 may include a server computer or blade server or network connected storage device 126(1) such as a web server, map/reduce server or other calculation engine, a laptop computer, a thin client, a terminal, or other mobile computer, a personal data assistant (PDA), a wearable computer such as a smart watches or a biometric or medical sensor, an implanted computer devices such as a biometric or medical sensor, a computer navigation consumer computer devices, and a satellite-based navigation system device (e.g., graphically represented as a PDA) including a global positioning system (GPS) device 126(2), a tablet computer or tablet hybrid computer 126(3), a smartphone, cell phone, cell phone-tablet hybrid device, or other communication device 126(4), a portable or console-based gaming device or other entertainment devices such as a network-enabled television, a set-top box, a media player, a graphically displayed camera or personal video recorder (PVR) 126(5), an automobile computer such as a vehicle control system or a vehicle security system 126(K), a desktop computer 126(1), or a computer device, appliance, or other computer configured to perform object detection and classification optimization as described herein.

The consumer computer devices 126 may be any type of computer device having one or more processing units 128 operatively linked to computer-readable media (CRM) 130 via a bus which may include more system buses, data buses, address buses, PCI buses, mini PCI buses, and various local, peripheral and/or independent buses.

The CRMs 110 and 130 described herein include computer storage media and/or communication media. The computer storage media may include a volatile memory implemented in any method or technology for storage of information such as computer-readable instructions, data structures, program modules, or other data, a non-volatile memory, and/or a storage unit, and removable and non-removable computer storage media such as other permanent and/or auxiliary computer storage media.

The computer storage media may include RAM, static RAM (SRAM), dynamic RAM (DRAM), phase change memory (PRAM), read only memory (ROM), erasable programmable read only memory (EPROM), electrically erasable programmable read only memory (EEPROM), flash memory, DVD, optical storage medium, magnetic cassette, magnetic tape, solid state memory (SSD), and the like.

Unlike the computer storage media, the communication media may embody other data with computer-readable instructions, data structures, program modules, or modulated data signals such as carrier waves or other transmission mechanisms. In the present specification, the computer storage media include no communication media.

Executable instructions stored in CRM 130 may include other modules, programs or applications that are loadable and executable by an operating system 134 and the processing unit 128. Additionally or alternatively, what is functionally described herein may be performed at least partially by one or more hardware logic components, such as an accelerator. For example, example types of hardware logic components that may be used include field-programmable gate arrays (FPGAs), application-specific integrated circuits (ASICs), application-specific standard products (ASSPs), system-on-a-chip (SOC) systems, complex programmable logic devices (CPLDs), and the like. For example, the accelerator may be a hybrid device of XILINX or ALTERA that includes a CPU embedded in an FPGA fabric.

The consumer computer device 126 also includes one or more I/O interfaces including one or more network interfaces 136 and user interfaces 138 to enable communication with other consumer computer devices 126 or other network devices such as the devices 106 over the network 104. The network interface 136 may include one or more network interface controllers (NICs) or other types of transceiver devices for transmitting and receiving communications over the network.

The consumer computer device 126 also includes user interface 138 so that the consumer computer device 126 can receive user input, such as an image having an identified object category and a response to the input. Additionally, the user interface 138 may display one or more images having objects and/or object classes within the image, and/or similar objects and/or object classes.

Figure 2:
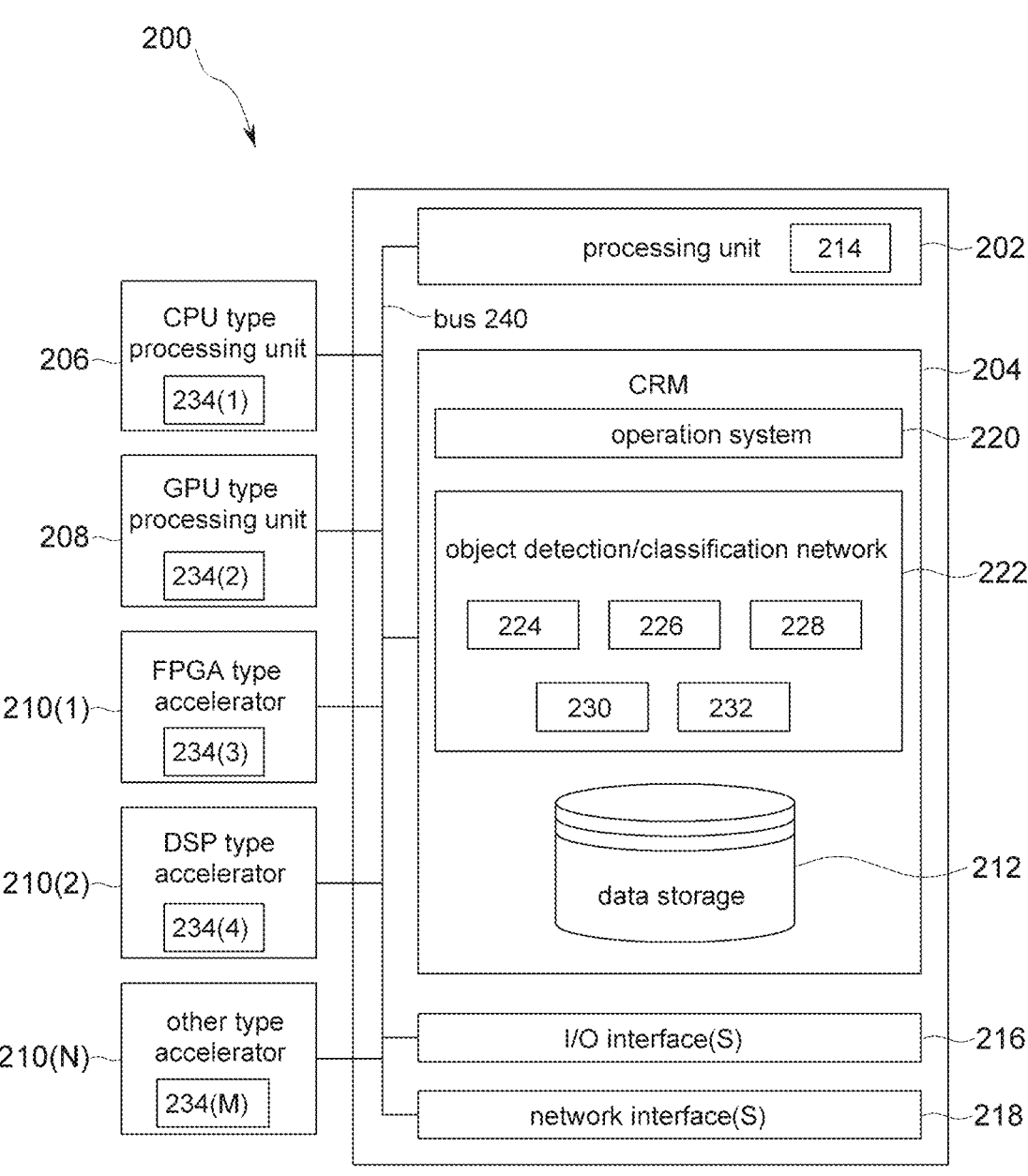
FIG. 2 is a block diagram illustrating an exemplary computer device configured to participate in the object detection and classification network.

FIG. 2 is a block diagram illustrating an exemplary computer device 200 configured to participate in the object detection and classification network. In some embodiments, the computer device 200 may be a single computer device that is a distributed computer resource, such as the device 106 of FIG. 1. In the device 200, a processing unit 202 may be, for example, a CPU type processing unit, a GPU type processing unit, a field programmable gate array (FPGA), a digital signal processor (DSP), or the processing unit 108 representing other hardware logic components that can be driven by the CPU. For example, the hardware logic components may include application-specific integrated circuits (ASICs), application-specific standard products (ASPs), system-on-a-chip (SOC) systems, and complex programmable logic devices (CPLDs), and the like.

In some embodiments, CRM 204 may represent CRM 110 and may store instructions executable by the processing unit 202 integrated in the device 200 as described above. The CRM 204 may also store executable instructions by an external processing unit, such as an external CPU type processing unit 206, an external GPU type processing unit 208, and/or an external accelerator 210 such as an FPGA type accelerator 210-1, a DSP type accelerator 210-2 or other accelerator 210-N

In the illustrated embodiment, the CRM 204 may also include a data store 212. In some embodiments, the data store 212 may include a data store such as a database, data warehouse, or other type of structured or unstructured data store. In some embodiments, the data store 212 may include a relational database and/or a corpus having one or more tables, which enable data access, such as a web table including one or more hypertext markup language (HTML) tables, resource description framework (RDF) tables, web ontology language (OWL) tables, and/or extensible markup language (XML) tables, indexes, stored procedures, and the like. For example, the data store 212 may store data and/or instructions for operations of processes, applications, components, and/or modules stored in the CRM 204 and executed by the processing unit 202.

The device 200 may further include one or more input/output (I/O) interfaces 216, and the input/output (I/O) interface 216 may be I/O interface 216 which enables the device 200 to communicate with input/output devices capable of communicating with a user input device including a peripheral input device (e.g., a keyboard, a mouse, a pen, a game controller, a voice input device, a touch input device, a gesture input device, etc.) and a peripheral output device (e.g., a display, a printer, etc.). Additionally, in the device 200, a network interface 218, which may be the network interface 136, may represent a network interface controller (NIC) or other type of transceiver device for transmitting and receiving communications over a network.

In the illustrated embodiment, the CRM 204 also includes an operating system 220, which may be the operating system 114. The CRM 204 also includes an object detection and classification network 222, which may be the object detection and classification network 116. The object detection and classification network 222 may include one or more modules and/or APIs, shown in blocks 224, 226, 228, 230 and 232, but this is only an example and the number of them may be more or less.

The functions described with respect to blocks 224, 226, 228, 230 and 232 may be combined to be performed by a fewer number of modules and/or APIs, or may be divided to be performed by a larger number of modules and/or APIs. For example, block 224 can represent an input module with logic to program the processing unit 202 of the device 200 to transfer an input (e.g., an image) to the object detection and classification network 222 for processing.

Block 226 may represent an initial processing module having logic to program the processing unit 202 to generate a convolutional feature map of the input. In various embodiments, the convolutional feature map may be different version of the input image. In at least one embodiment, the convolutional feature map may be a CONV5 feature map.

In some embodiments, the initial processing module may include a deep convolutional neural network (Deep CNN). In these embodiments, the Deep CNN may process the input image through multiple convolutional layers, max pooling layers, region-of-interest pooling layers, and/or fully connected layers. The input image may be iteratively processed through each layer of the Deep CNN and output as a convolutional feature map. The Deep CNN may be Zeiler and Fergus model, Simonyan and Zisserman model, or a convolutional neural network model.

Block 228 may represent an object proposal module having logic in the program processing unit 202 to propose one or more candidate object positions (e.g., proposals) on the convolutional feature map. In various embodiments, the proposal may represent a bounding box, a masking, an edge detection, or other form of recognizing the positions of candidate objects in an image.

In various embodiments, the object proposal module may include a region proposal network (RPN), which may be a neural network. In these embodiments, the RPN processes the convolutional feature map and estimates candidate objects and their corresponding positions. Based on the estimate, the RPN may draw a proposal in the form of a bounding box around each candidate object in the convolutional feature map. In various embodiments, the bounding box may be rectangular. However, in other examples, the bounding box may be circular, hexagonal or other shapes.

Block 230 may represent an object classifier module having logic to program the processing unit 202 to evaluate candidate objects proposed by the object proposal module. In various embodiments, the object classifier module may evaluate each proposal and determine the classification (e.g., type, class, group, category, etc.) of the candidate object in the proposal. In some embodiments, the classification of an object may be based on a fixed number of object classes which are determined in advance. For example, the object classifier may evaluate an object and determine whether the object is one of 20 pre-determined object classes. In another example, the object classifier may evaluate an object and determine whether the object is one of 30 pre-determined object classes. In another embodiment, the object classifier may periodically receive updated object classes.

In various embodiments, the object classifier module may calculate a confidence score. In such embodiments, the confidence score may be based on a degree of certainty that an object belongs to an assigned object category. For example, the object classifier module may determine that the candidate object is a human. Since the shape of the human body is very distinct, the object classifier module may determine with 95% certainty that the object is human, so the confidence score is 0.95. For another example, the candidate object may be blurry or a discrete angle of a human figure. Thus, the object classifier module may have low confidence in the object class, and may assign a confidence score of 0.8, for example.

In various embodiments, the object classifier module may include a region-based convolutional neural network (R-CNN). In these examples, the R-CNN may be a fast R-CNN.

Block 232 may represent a machine learning module having logic to program the processing unit 202 of the device 200 for extracting a plurality of training images, object data (e.g., object category, position, number, etc.) corresponding to the training images, and starting parameters. In some embodiments, a plurality of training images, object data corresponding to the training images, and starting parameters may be stored in the computer device 200, such as the data store 212, for example. In some embodiments, the training images, the object data corresponding to the training images, and the starting parameters may be extracted or received from a remote computer device through the network interface 218 and stored in the data store 212. In at least one example, the machine learning module may use training images, object data corresponding to the training images, and starting parameters from an image database such as ImageNet.

In various embodiments, the machine learning module may train the object detection and classification system in a multi-step process. In such embodiments, the machine learning module may train the system using stochastic gradient descent and back propagation. In some embodiments, the machine learning module may initialize the initial processing module, the object proposal module, and the object classifier module with starting parameters. After initialization, the machine learning module may train the parameters of the initial processing module and the object proposal module together using the training images to output a convolutional feature map along with the trained proposals. The machine learning module may train the parameters of the object classifier module with the trained proposals generated by the object proposal module.

Next, the machine learning module may reinitialize the initial processing module and the object proposal module using the trained parameters generated in the above step. In various embodiments, parameters trained for initialization of the initial processing module may include a frozen convolutional layer (e.g., an invariant convolutional layer). In some embodiments, parameters trained for initialization of the object classifier module may include a frozen convolution layer and frozen parameters in the object proposal module.

After reinitialization of the initial processing module, the machine learning module may further train the parameters of the initial processing module and the object proposal module with the trained images to output a convolutional feature map with highly trained proposals. Finally, the machine learning module may train the object classifier module with highly trained proposals generated by the object proposal module. The machine learning module may set trained parameters across the initial processing module, the object proposal module and the object classifier module.

In various embodiments, the machine learning module may train the object detection and classification system in a single step process using back propagation. In these embodiments, the machine learning module may initialize the initial processing module, the object proposal module, and the object classifier module with starting parameters. After initialization, the machine learning module may process training images through the initial processing module, the object proposal module, and the object classifier module. The machine learning module may use back propagation to score output proposals, classifications, and confidence scores based on data corresponding to the training images. The machine learning module may train parameters in the initial processing module, the object proposal module and the object classifier module to improve the accuracy of axial object classification and confidence scores.

In various embodiments, the machine learning module may train the system in initial setup. In another embodiment, the machine learning module may periodically train the system at designated times weekly or monthly. In some embodiments, the machine learning module may obtain or access data to train the object detection and classification system when directed manually by a program manager.

Alternatively, some or all of the above-mentioned data (e.g., the training images and the object data corresponding to the training images) may be stored in a separate memory 234 such as a memory 234-1 on the CPU type processing unit 206, a memory 234-2 on the GPU type processing unit 208, a memory 234-3 on the FPGA type accelerator 210-1, a memory 234-4 on the DSP type accelerator 210-2, and/or a memory 234M on the other accelerator 210-N.

A bus 240 may be the bus 112 and may include one or more of a system bus, a data bus, an address bus, a PCI bus, a Mini-PCI bus, and any of a variety of local, peripheral, and/or independent buses. In addition, the bus 240 may operatively link the CRM 204 to the processing unit 202.

Figure 3:
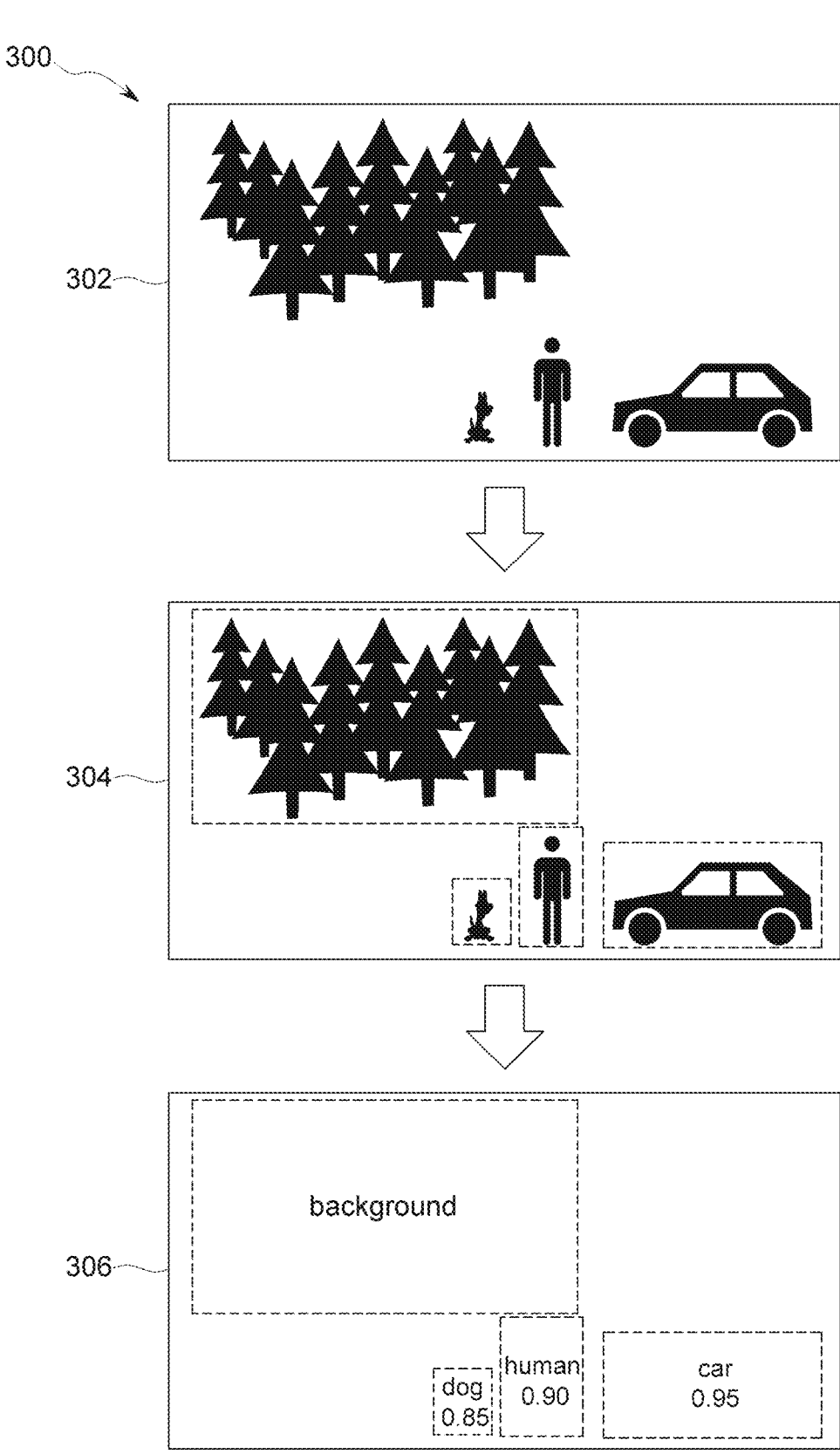
FIG. 3 is a flow diagram illustrating an exemplary process of the object detection and classification network.

FIG. 3 is a flow diagram illustrating an exemplary process of the object detection and classification network. In various embodiments, the object detection and classification network may be implemented by a plurality of networks working together to detect and classify objects in an image. The plurality of networks will be described in more detail below with reference to FIGS. 4 and 5.

At 302, the deep convolutional neural network (Deep CNN) may receive an input image. An input image may include one or more objects. As shown, the input image includes a human, a dog, a car, and a forest of trees. In other embodiments, the input image may include more or fewer objects.

In various embodiments, the Deep CNN may process the input image through multiple layers. The layers may include a convolutional layer and/or a pooling layer. In some embodiments, the Deep CNN may include Zeiler and Fergus model with 5 layers. In another embodiment, the Deep CNN may include Simonyan and Zisserman model with 13 layers. In some embodiments, the Deep CNN may output a convolutional feature map. In at least one embodiment, the convolutional feature map includes a CONV5 feature map.

At 304, the convolutional feature map may be input into the regional proposal network (RPN) for processing. In various embodiments, the RPN may process the convolutional feature map and estimate one or more candidate objects and positions (e.g., proposals) on the convolutional feature map. In an illustrative example, based on the hypotheses, the RPN may create a rectangular bounding box around each candidate object. However, in other examples, the bounding box may be of other shapes (e.g., oval, circular, hexagonal, etc.). Additionally or alternatively, the RPN may generate a mask, for example, through edge detection, to substantially enclose the candidate object. In various examples, the RPN may output a convolutional feature map with proposals.

At 306, the convolutional feature map along with the proposals may be input to the proposal classifier. In various embodiments, the proposal classifier may be a component of a region-based convolutional neural network or other type of convolutional neural network. In at least one example, the proposal classifier network may be a component of a fast region-based convolutional neural network (FRCN).

In various embodiments, the proposal classifier may evaluate each proposal in the convolutional feature map and determine the category (e.g., class, type, etc.) of the object in the proposal. In some embodiments, the proposal classifier may determine the object category by comparing the object with pre-specified objects in the proposal classifier network (e.g., FRCN). In some embodiments, when the proposal classifier does not recognize the category, it may designate the proposal as a background. For example, as shown in FIG. 3, the forest of the input image is not recognized as one of the object categories and is designated as the background.

As shown at 306, the proposal classifier may output an object category for each proposal. The proposal classifier can also generate a confidence score associated with each object category. In various embodiments, the confidence score may be based on similarities between objects in the proposal and objects associated with predefined object categories. In such embodiments, objects associated with predefined object categories may be learned from training images. Similarity may be based on object curve, size, aspect ratio, angle, or other characteristics of the object. In some embodiments, the confidence score may be calculated for each proposal. In another embodiment, the confidence score may be calculated for each proposal except for those designated as the background.

Figure 4:
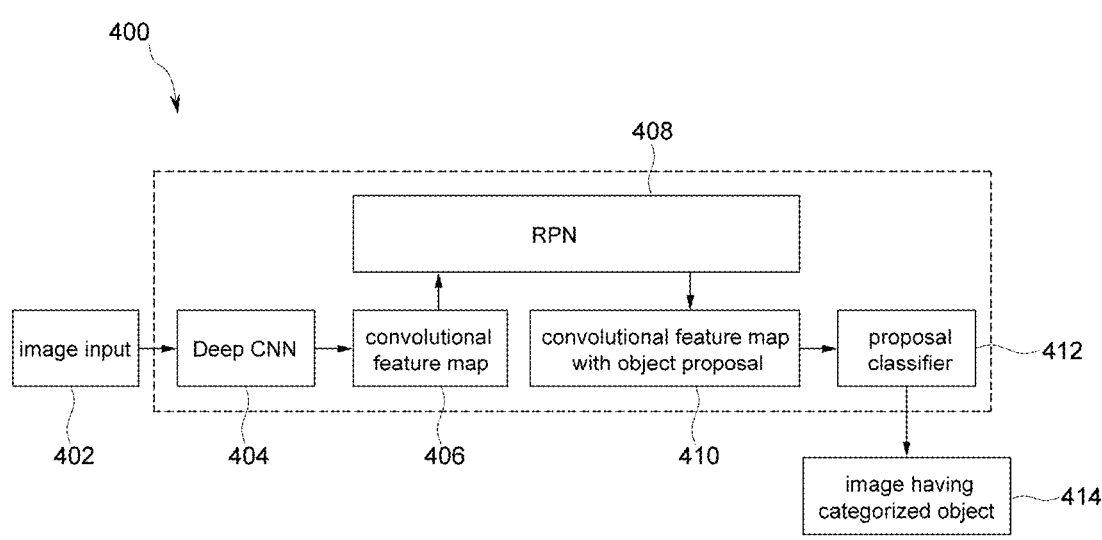
FIG. 4 is a data flow diagram illustrating an exemplary architecture of the process of the object detection and classification network described in FIG. 1.

FIG. 4 is a data flow diagram illustrating an exemplary architecture of the process of the object detection and classification network 400 described in FIG. 3.

At 402, the object detection and classification network 400 may receive an input image. In various embodiments, the input image may be received from the consumer computer device 126.

At 404, the deep convolutional neural network (Deep CNN) may receive an input image. The input image may include one or more objects. For example, as shown in FIG. 3, the input image may include a human, a dog, a car, and a forest. In other examples, the input image may include more or fewer objects.

In various examples, the Deep CNN may process the input image through multiple layers. The layers may include a convolutional layer, a pooling layers, and/or other types of processing layers. The Deep CNN may include Zeiler and Fergus models with 5 layers, Simonyan and Zisserman models with 13 layers, or other Deep CNN models with multiple layers.

In some embodiments, at each layer, the Deep CNN may process the input image, and adjust and/or resize the input image to more easily detect objects in the image by subsequent mini-networks in the object detection and classification network 400.

At 406, the Deep CNN may output a convolutional feature map. In at least one embodiment, the convolutional feature map includes a CONV5 feature map.

At 408, the convolutional feature map may be input into the region proposal network (RPN). In various embodiments, the RPN may include a component that evaluates an image presented on the convolutional feature map at each of a plurality of points to determine whether an objector part thereof is located at that point. In some embodiments, the RPN may calculate an objectness score. In this example, when the objectness score exceeds a threshold value, the RPN may determine that the object or part thereof is located at a specific point. In various embodiments, the plurality of points may include a plurality of grid points. In such embodiments, the grid point may be a point on a line grid, curve, sector, radius, or other lines of a section of the convolutional feature map.

Based on the determination at each of the plurality of grid points, the RPN may identify a proposal for a candidate object (e.g., candidate object position). In other words, the RPN may determine where the candidate object (e.g., a potential object in an image) is located, and may identify the candidate object as a proposal. The proposal may be depicted as a rectangular bounding box, mask, or other type and/or shape specifying a position as a candidate object. The RPN is described in detail with reference to FIG. 5.

At 410, the RPN outputs the processed convolutional feature map along with the proposal. In various embodiments, the convolutional feature map may include more proposals than objects in an image.

At 412, the convolutional feature map with the proposals may be input to the proposals classifier. In various embodiments, the proposal classifier may evaluate each proposal in the convolutional feature map and determine whether the proposal specifies an object in the image. In some embodiments, the proposal classifier may evaluate a proposal specifying an object and determine an object category based on similarities in features between the proposal and the object category (e.g., class, type, etc.). In some embodiments, the proposal classifier may compare a proposal with a set of object categories and determine an object category based on similarities in features between the proposal and the object categories. In at least one embodiment, the proposal classifier may include a set of 20 object categories. In other embodiments, the set may include more or fewer object categories than 15 or 25 object categories.

In some embodiments, in response to failing to match an object within a specific proposal to an object category, the proposal classifier may designate an object of a specific proposal as a background.

In various embodiments, the set of object categories may be fixed upon initialization. In some embodiments, the set of object categories may increase and/or decrease periodically based on a perceived need. For example, a program manager may recognize the need to add a category for a cat based on a tendency to search for images related to cats. In these embodiments, the program manager initializes the machine learning module shown in FIG. 2 to train the network to recognize a cat in an image.

At 414, the proposal classifier may output an image having categorized objects related to the proposal. Further, the proposal classifier may generate a confidence score associated with each object category. In various embodiments, the confidence score may be based on similarities between an object within the proposal and objects associated with predefined object categories. In such embodiments, the objects associated with predefined object categories may be learned from training images. The degree of similarity may be based on an object's curve, size, aspect ratio, angle, or other characteristic of the object. In some embodiments, the confidence score may be based on the probability that the object is believed as an object in the proposal classifier. In some embodiments, the confidence score may be calculated for each proposal except those designated as background.

The above description is briefly summarized as follows.

As the first step, the region proposal network (RPN) generates a proposal box by proposing anchors on the convolutional feature map.

In the second step, the region CNN (R-CNN) subdivides and classifies the proposals generated by the region proposal network (RPN).

Figure 5:
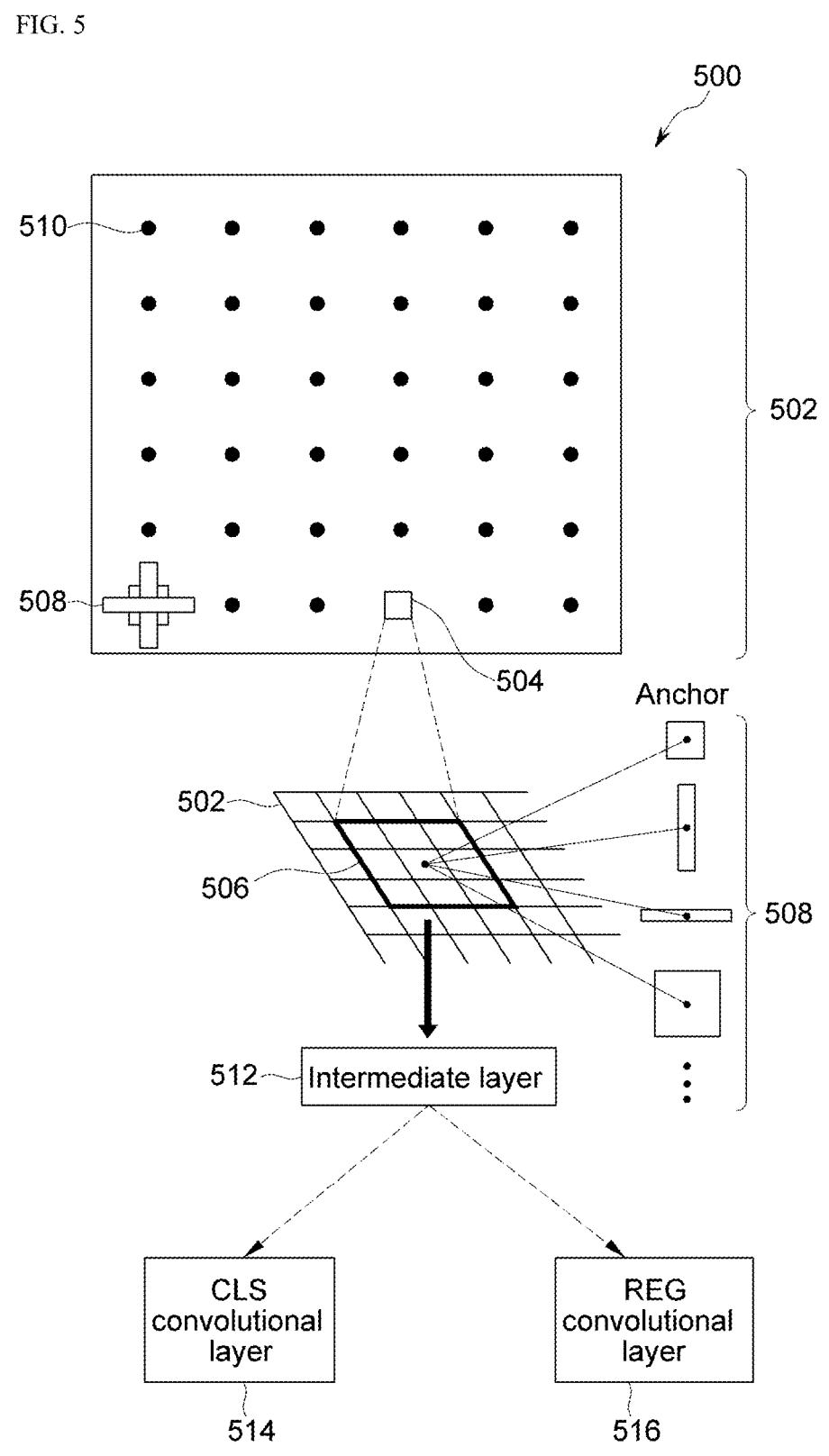

FIG. 5 is an exemplary diagram of a general region proposal network 500 used in the object detection and classification network shown in FIGS. 1 to 4. As described above, the RPN 500 receives a convolutional feature map 502 from the deep convolutional neural network (Deep CNN), identifies candidate objects (e.g., potential objects) of the convolutional feature map 502, and generates proposals on the candidate objects.

In various embodiments, the RPN 500 may include a component configured to identify candidate objects. In some embodiments, the component may include n×n convolutional layers 504. As shown in FIG. 5, the convolutional layer 504 may be in a 3×3 configuration. In other embodiments, the convolutional layer 504 may be of a larger or smaller configuration. In various examples, the n×n convolutional layer 504 may be a sliding window 506.

An anchor is defined by its scale and aspect ratio, and a set of anchors with different scales and aspect ratios is required to obtain a sufficient amount of samples overlapping the target object. To achieve high detection performance, it is important to set the appropriate scale and aspect ratio, and a significant amount of tuning is required.

Referring to FIG. 5, in general, the components of the RPN 500 may include k number of anchors 508 centered on the sliding window 506. In various embodiments, these anchors 508 may be related to scale and aspect ratio. In these examples, the number of anchors 508 may be based on the number of scales and aspect ratios. In at least one embodiment, the anchors 508 may have three different aspect ratios (e.g., 1:1, 2:1, 1:2) and three different scales (e.g., scales with box areas of $128^2$, $256^2$ and $512^2$), so the total number of k=9 anchors may be included. In other embodiments, the number k of the anchors 508 may be greater or lesser.

In various embodiments, the components of the RPN 500 may be configured to identify candidate objects by applying the sliding window 506 with an anchor 508 to each of a plurality of points 510 in the convolutional feature map 502 to determine whether an object or part of the object exists at a point 510.

In some embodiments, the number of points 510 may be determined by the size of the input image. For example, a 228 pixel image may contain more points than a 171 pixel image.

In addition, regardless of the number of points 510 in the convolutional feature map, the component may apply the same sliding window 506, the same anchor 508 (i.e., k=1) and the same function at one point 510 of the plurality of points. In other words, the components of the RPN 500 may not change.

When using an anchor of k=1, the RPN 500 may be a cascade RPN.

Figure 6:
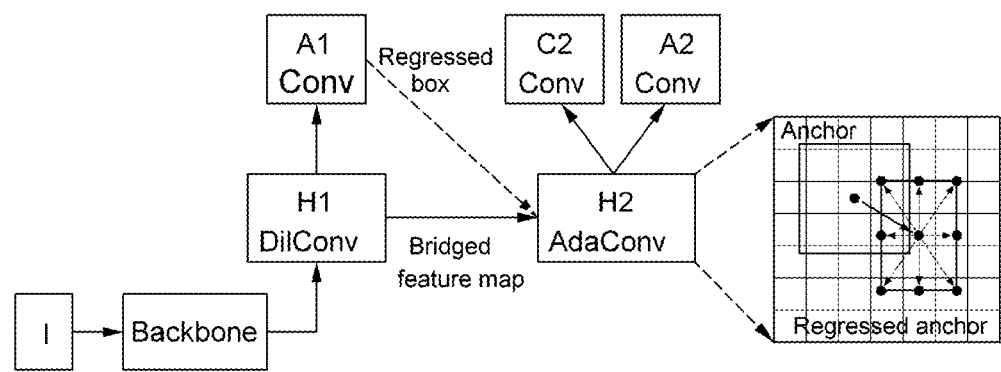
FIG. 6 is an exemplary diagram schematically illustrating a configuration of a cascade RPN.

FIG. 6 is an exemplary diagram schematically illustrating a configuration of the cascade RPN.

As shown in FIG. 6, the cascade RPN may include dilated convolution as a first stage and adaptive convolution as a second stage.

Referring to FIG. 6, I is an input image, B is a neural network that generates a convolutional feature map, H1 is dilated convolution, H2 is adaptive convolution, C is a classifier, and A is an anchor regressor.

Although shown as two stages in FIG. 6, the present disclosure is not limited thereto, and the number of stages may be further expanded by adding at least one of dilated convolution and adaptive convolution.

The detailed description of the dilated convolution is as follows.

Let F: $Z^2 \rightarrow R$ be a discrete function, let $\Omega_r = [-r, r]^2 \cap Z^2$ and let k: $\Omega_r \rightarrow R$ be a discrete filter of size $(2r+1)^2$. The discrete convolution operator may be defined as follows.

$$(F \cdot k)(p) = \sum_{s+t=p} F(s)k(t) \tag{1}$$

By generalizing this operator, let 1 be the dilation factor and $\cdot 1$ is defined as follows.

$$(F \cdot lk)(p) = \sum_{s+lt=p} F(s)k(t) \tag{2}$$

$\cdot 1$ is called dilated convolution or 1– dilated convolution.

The dilated convolution supports exponential expansion of the receptive field without losing resolution or coverage. Let $F_0, F_1, \ldots, F_{n-1}: Z^2 \rightarrow R$ be a discrete function and let $k_0, k_1, \ldots, k_{n-2}: \Omega_1 \rightarrow R$ be a discrete 3×3 filter. Applying a dilation filter that increases exponentially gives:

$$F_{i+1} = F_i \cdot 2^i k_i, i=0,1, \ldots, n-2 \tag{3}$$

Let the receptive field of element p at $F_{i+1}$ be defined as a set of elements of $F_0$ that change the value of $F_{i+1}(p)$. Let the size of the receptive field of element p at $F_{i+1}$ be the number of elements.

It is easy to see that the size of the receptive field of each element at $F_{i+1}$ is $(2^{i+2}-1) \times (2^{i+2}-1)$. The receptive field is the square of an exponentially increasing magnitude.

Figure 7:
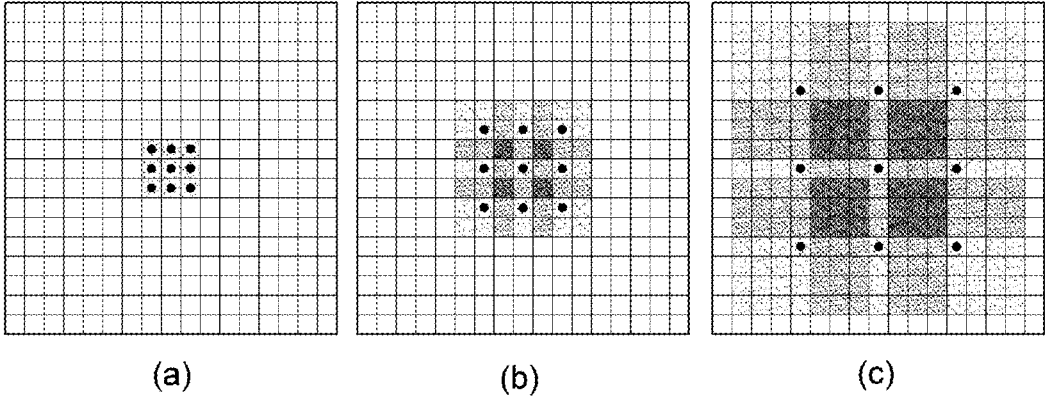
FIG. 7 is a conceptual diagram showing a receptive field of dilated convolution.

FIG. 7 are conceptual diagrams showing a receptive field deformed by the dilated convolution.

Referring to (a) to (c) of FIG. 7, (a) $F_1$ is generated from $F_0$ by 1– dilated convolution; each element of $F_1$ has a receptive field of 3×3. (b) $F_2$ is generated from $F_1$ by 2– dilated convolution and each element of $F_2$ has a receptive field of 7×7. (c) $F_3$ is generated from $F_3$ by 4– dilated convolution and each element of $F_3$ has a receptive field of 15×15. The number of parameters associated with each layer is the same. The receptive field increases exponentially while the number of parameters increases linearly.

Referring to (b) of FIG. 7, since the receptive field is 7×7, when implemented with a normal filter, the number of parameters of the filter is required to be 49, and considering that convolution occupies the highest amount of computation in the CNN, it acts as a significant burden. However, when dilated convolution is applied, only the parts marked with dots out of 49 have parameters, and the remaining 40 are all 0, so the computational burden is the same as processing a 3×3 filter.

Referring again to FIG. 6, when a feature map x is given to adaptive convolution, in standard 2D convolution, the feature map is first sampled using a regular grid R={(rx, ry)}, and the sample is summed with a weight w. Here, the grid R is defined by the kernel size and dilation. For example, R={(−1, −1), (−1, 0), . . . , (0, 1), (1, 1)} corresponds to kernel size 3×3 and 1– dilation. Each position p on the output feature y has the following value.

$$y[p] = \sum_{r \in R} w[p] \cdot x[p + r] \tag{4}$$

In the adaptive convolution, the regular grid R is replaced by an offset field O that is inferred directly from the input anchors.

$$y[p] = \sum_{o \in 0} w[p] \cdot x[p + o] \tag{5}$$

Offset o can be separated into center offset and shape offset (see FIG. 6).

$$o = o_{ctr} + o_{shp} \tag{6}$$

where $o_{ctr} = (a_x - p_x, a_y - p_y)$ and $o_{shp}$ is defined as anchor shape and kernel size. For example, if the kernel size is 3×3, then $o_{shp} \in (-a_w/2, a_h/2), (-a_w/2, 0), \ldots, (0, a_h/2), (a_w/2, a_h/2)$. Since the offset is usually prime, the sampling is done by bilinear interpolation.

The adaptive convolution performs sampling within the anchor to ensure alignment between the anchor and the feature. The adaptive convolution is closely related to the dilated convolution. When the center offset is 0, the adaptive convolution is the dilated convolution.

Referring to FIG. 6, the two-stage cascade RPN systematically aligns features to anchors using the adaptive convolution. In the first stage, the adaptive convolution is set to perform the dilated convolution since the dilation convolution has an anchor center offset of zero. Since the spatial order of features is maintained by the dilated convolution, the features of the first stage are bridged to the next stage.

Referring again to FIG. 5, in various embodiments, the sliding window 506 may be mapped to an intermediate layer 512. In such embodiments, the intermediate layer 512 may be a low-dimensional vector. For example, in a network using the Zeiler and Fergus model Deep CNN, the sliding windows may be mapped to a 256-d vector. As another example, in a network using the Simonyan and Zisserman model Deep CNN, the sliding window may be mapped to a 512-d vector.

In some embodiments, the intermediate layer 512 may be provided with two convolutional layers, a box classification layer (CLS convolutional layer) 514 and a box regression convolutional layer (REG convolutional layer) 516. In various embodiments, the CLS convolutional layer 514 and the REG convolutional layer 516 may be a 1×1 convolutional layer. In another embodiment, the CLS convolutional layer 514 and the REG convolutional layer 516 may be of a larger or smaller size. In at least one embodiment, the CLS convolutional layer 514 and the REG convolutional layer 516 may be a fully connected layer.

In various embodiments, the CLS convolutional layer 514 may be configured to calculate an objectness score for each of the k anchors 508 (one in the case of the cascade RPN) located at one of the plurality of points. The objectness score may be based on the probability that an object or part of the object is co-located with anchor 508. In some embodiments, the objectness score and the CLS convolutional layer 514 may be based on an intersection-over-union (IoU) representing the degree of overlap with a ground truth box (e.g., ground truth item). In such embodiments, the objectness score may be an overlap ratio or a function thereof.

In addition, the CLS convolutional layer 514 may assign a class label to each anchor 508. In such an embodiment, the class label may be based at least in part on an overlap with the ground truth box, and thus may indicate whether the object is positioned at the anchor 508. The class label may be positive indicating that the object is located at the anchor 508 or negative indicating that the object is not located at the anchor 508. In various embodiments, the class label may be neutral, which indicates that an insignificant amount of anchor 508 covers the object. However, neutral indications and associated anchors in this example may be ignored by the components of the RPN 500.

Additionally, the cascade RPN performs subdivision in multiple stages using a single anchor for each point instead of using multiple anchors with a predefined scale and aspect ratio. For example, when the cascade RPN has two stages, in the first stage, the cascade RPN determines an anchor box as a positive sample when the distance between the center of the anchor and the center of an anchor, which is an anchor-less metric, is less than or equal to a reference value.

In at least one embodiment, the anchor with the highest overlap with a specific ground truth box and the anchor with an IoU overlap ratio greater than 0.7 with the ground truth box may be indicated as positive. In addition, non-positive anchors with an IoU overlap ratio less than 0.3 for all ground truth boxes may be labeled as negative.

In various embodiments, the REG convolutional layer 516 may be configured to calculate four coordinate values for each anchor. In such embodiments, the coordinate values may include, for example, $a_x$, $a_y$, $a_w$, and $a_h$. In some embodiments, the REG convolutional layer 516 may take coordinate values for anchors, and calculate the shift in the center ($a_x$, $a_y$) of each anchor 508, and the shift in height and width ($a_w$, $a_h$) (e.g. scale). In such embodiments, the anchors may be adjusted to a shift and scale that can most effectively cover the object.

In various embodiments, the RPN 500 component may use Non Maximum Suppression (NMS) to determine anchors that may provide a basis for each proposal. In such embodiments, the RPN 500 component may take the anchor with the highest objectness score (e.g., the highest IoU overlap ratio) at a specific point and suppress all other anchors at the specific point. In addition, the RPN 500 component may suppress other anchors that overlap significantly with the highest scoring anchor but have low objectness scores. Accordingly, the component of the RPN 500 can reduce the number of anchors used to determine proposals and the number of anchors output to the proposal classifier. In various embodiments, the maximum number of unsuppressed anchors may be 300 anchors. In another embodiment, the maximum number of unsuppressed anchors may be more or less.

In various embodiments, the RPN 500 component may apply the shift calculated by the REG convolutional layer 516 and the scaled non-suppression anchor to determine the proposal. In such embodiments, the proposal may include a bounding box around the shifted and scaled unsuppressed anchors. As discussed above, the RPN 500 may output a convolutional feature map along with a proposal. The convolutional feature map with the proposal may be input to the proposal classifier for object classification. In various embodiments, the RPN 500 and the classifier may share multiple convolutional layers to speed up the object detection and classification network. The RPN 500 may be trained with training images to ensure accuracy of the object detection and classification network. The object detection and classification network training will be described in detail with reference to FIG. 9.

In various embodiments, the computer system may train the RPN to identify proposals using machine learning techniques. In such embodiments, the computer system may train the RPN to recognize whether the anchor overlaps an object in the image, and if so, how to shift and scale the anchor to most effectively overlap the object.

The term "machine learning" may refer to one or more programs that learn from received data. For example, a machine learning mechanism may build, modify, or otherwise use a model generated from example inputs, and the machine learning mechanism may use the model to make predictions or decisions. In the embodiments, the machine learning may be used to improve proposal generation (e.g., candidate object detection) within an image.

In various embodiments, the computer system may train the RPN 500 on a single scale image. In some embodiments, the image may be rescaled such that the shorter side becomes s=600 pixels. As described above, an anchor may include an (n×n) scale and aspect ratio. In at least one embodiment, the anchors may include three scales with box areas of $128^2$, $256^2$ and $512^2$ and three aspect ratios of 1:1, 1:2 and 2:1.

In some embodiments, the RPN 500 may be initialized with a known pre-trained model that includes one or more parameters. For example, the RPN may be initialized with an ImageNet pre-trained model.

After initialization, the computer system may assign a positive label to the anchor 508 having the highest Intersection-over-Union (IoU) overlap ratio with a ground truth item and the anchor 508 higher than a predetermined IoU overlap ratio with the ground truth box. In various embodiments, a predetermined percentage may be 70%. In some embodiments, the predetermined percentage may be higher or lower than 70%. For example, the predetermined percentage may be 65%. In another embodiment, the predetermined percentage may be 75%.

In some embodiments, a single ground truth box may cause the computer system to assign one positive label to multiple anchors 508. In other words, one or more anchors may overlap with each other and with the ground truth box, in a proportion large enough to assign positive labels to one or more anchors. In various embodiments, the computer system may reduce the number of anchors per image by ignoring cross-border anchors. For example, a typical 1000× 600 image has approximately 20,000 anchors. When ignoring the cross-border anchors, only 6,000 anchors per training image are considered.

In various embodiments, the computer system may assign a negative label to a non-positive anchor 508 having an IoU ratio lower than 0.3 for all ground truth boxes.

In addition, the cascade RPN performs subdivision in multiple stages using a single anchor per point instead of using multiple anchors with a predefined scale and aspect ratio. For example, when the cascade RPN has two stages, in the first stage, the cascade RPN determines an anchor box as a positive sample when the distance between the center of the anchor and the center of an anchor, which is an anchor-less metric, is less than or equal to a reference value. In the second stage, the cascade RPN determines an anchor box as a positive sample when the anchor box has an IoU above the reference value, which is an anchor-based metric. Specifically, referring to FIG. 6, based on the distance between the center of the anchor and the center of the object in the first stage, when the center of the anchor is within the center area of the object, a first anchor regressor A1 processes the anchor as a positive sample. In the second stage, a second anchor regressor A2 processes the anchor as a positive sample when the IoU with the object is greater than the IoU reference value.

In some embodiments, the computer system may minimize an object function of the RPN. For anchor box i, the loss function is defined as:

$$L(p_i, a_i) = L_{cls}(p_i, p_i^*) + \lambda p_i^* L_{reg}(a_i, a_i^*)$$ (7)

where $p_i$ is the predicted probability that anchor i is an object. When the anchor is labeled positive, $p_i^*$ is 1, and when the anchor is labeled negative, $p_i^*$ is 0. $a_i = \{a_x, a_y, a_w, a_h\}_i$ indicates the four parameterized coordinates of the predicted bounding box, and $a_i^* = \{a_x^* a_y^* a_w^* a_h^*\}_i$ indicates the ground truth box associated with the positive anchor. The classification loss $L_{cls}$ is the softmax loss of the two classes (object versus non-object).

In various embodiments, regression loss may be defined as:

$$L_{reg}(a_i, a_i^*) = R(a_i - a_i^*)$$ (8)

R is a strong loss function (smooth-Li). The term $p_i^* L_{reg}$ means that regression loss is only enabled for positive anchors ($p_i^* = 1$), otherwise it is disabled ($p_i^* = 0$). The loss balancing parameter $\lambda$ may be set to 10 to bias towards a better box position. In various embodiments, the outputs of the CLS convolutional layer 514 and the REG convolutional layer 516 may be $\{p_i\}$ and $\{a_i\}$.

In various embodiments, the RPN 500 may be trained end-to-end by backpropagation and stochastic gradient descent (SGD). The SGD is just an example algorithm that the machine learning module can apply along with backpropagation to train the RPN model. Another embodiment may use a limited memory Broyden-Fletcher-Goldfarb-Shanno (BFGS) algorithm, an Orthant-wise Limited-memory quasi-Newton (OWL-QN) algorithm, or other algorithms for candidate object proposal optimization.

In some embodiments, the RPN 500 training may be optimized by randomly sampling 256 anchors from an image, and calculating a mini-batch's loss function of the sampled positive and negative anchors with a 1:1 ratio. As mentioned above, the shared convolutional layer is initialized by pre-training a classification model such as ImageNet classification, for example. A new layer (i.e., a nonshared convolutional layer) can be initialized by drawing the weights in a zero-mean Gaussian distribution with a standard deviation of 0.01.

In various embodiments, after initialization of the layer, the computer system may set one or more learning rates to be implemented in the data set. In at least one embodiment, the computer system may set a learning rate of 0.001 for the first 60,000 mini-batches, and may be implemented on the data set with a learning rate of 0.0001 for the next 20,000 mini-batches. In at least one embodiment, the data set may be a PASCAL data set. In addition, the computer system may set momentum and weight decay. In at least one embodiment, momentum may be 0.9 and weight decay may be 0.0005.

In various embodiments, the computer system may train the RPN 500 on a single scale image. In some embodiments, the image may be re-scaled to s=600 pixels on the shorter side. As mentioned above, an anchor may include an (n×n) scale and aspect ratio. In at least one embodiment, the anchor may include three scales with box areas of $128^2$, $256^2$ and $512^2$ and three aspect ratios of 1:1, 1:2 and 2:1.

When the RPN 500 is the cascade RPN, there may be one anchor with one aspect ratio and one area per point.

The computer system may train the RPN 500 concurrently with the Deep CNN to generate a convolutional feature map with an accurate proposal. The convolutional feature map may be input to the FRCN proposal classifier and shares multiple convolutional layers with the RPN 500. Due to the shared convolutional layers, the speed of the entire object detection and classification network is greatly increased compared to previous object detection and classification models.

As another embodiment, the loss function of cascade RPN is as follows.

$$L = \lambda \sum_{\tau=1}^{T} \alpha^\tau L_{reg}^\tau + L_{cls}$$ (9)

where $L_{reg}^\tau$ is the regression loss at stage $\tau$ with a weight of $\alpha^\tau$, and $L_{cls}$ is the classification loss.

The two loss terms are balanced by $\lambda$. In this embodiment, binary cross entropy loss and IoU loss are used as the classification loss and the regression loss, respectively.

Figure 8:
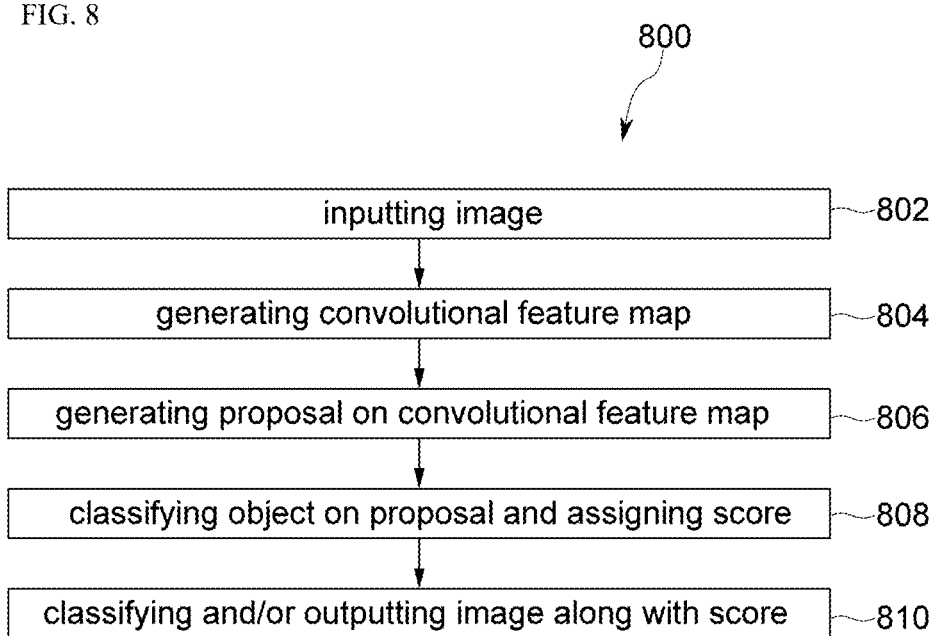
FIG. 8 is a flowchart illustrating a process of the object detection and classification network.
Figure 9:
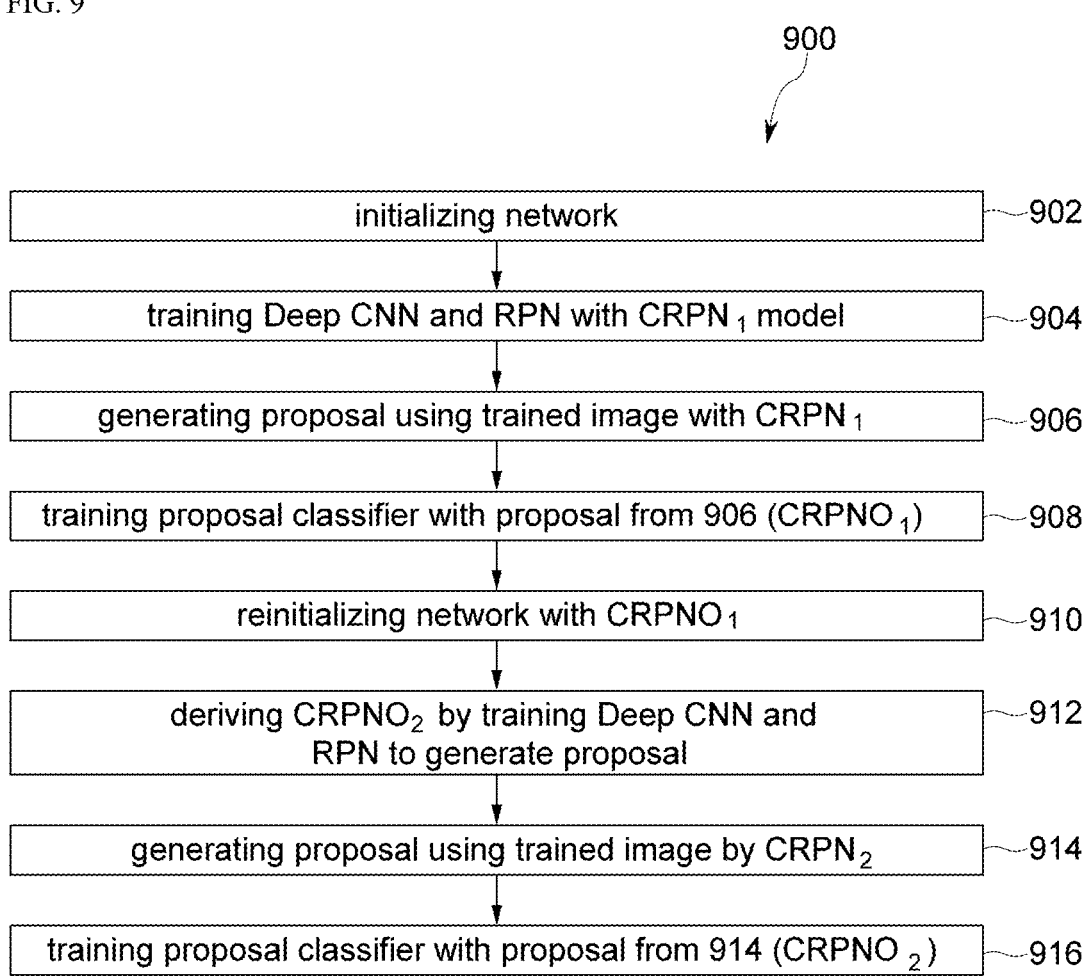
FIG. 9 is a flowchart illustrating a process for training one or more parameters of an object detection network to detect and classify objects in images.

FIGS. 8 and 9 are flowcharts illustrating an exemplary process for the object detection and classification network and training the object detection and classification network. The operation of the exemplary process is shown in individual blocks and described with reference to these blocks. The process is shown as a logical flow of the blocks, and each block may represent one or more operations that may be implemented in hardware, software, or a combination thereof. In the context of software, operations represent computer-executable instructions stored on one or more computer-readable media that, when executed by one or more processors, enable the one or more processors to perform the recited operations. The computer-executable instructions typically include routines, programs, objects, modules, components, data structures, those that perform specific functions or implement specific abstract data types. The order in which the operations are described should not be construed as limiting, and the number of operations described may be subdivided into multiple sub-operations in any order or executed in parallel.

FIG. 8 is a flowchart illustrating a process flow 800 of the object detection and classification network.

At block 802, the computer system may receive an image. In various embodiments, the image may be received from the consumer computer device 126 through the network 104. In some embodiments, the image may be received from the data store 212 on the computer device 200.

At block 804, the computer system may process the image through the deep convolutional neural network (Deep CNN) to generate a convolutional feature map corresponding to the image. In various embodiments, a Deep CNN may include multiple layers. The layer may include a convolutional layer and/or a pooling layer. In some embodiments, the Deep CNN may be Zeiler and Fergus model with 5 layers. In another embodiment, the Deep CNN may be Simonyan and Zisserman model with 13 layers.

At block 806, the computer system may input the convolutional feature map into the region proposal network (RPN) to generate proposals on the convolutional feature map. In various embodiments, the RPN may process the convolutional feature map and estimate one or more candidate objects and their positions (e.g., proposals) on the convolutional feature map. In some embodiments, the proposal may be a rectangular bounding box that substantially encloses each candidate object. In other embodiments, the proposal may be other shapes and/or types of candidate image position recognition.

In various embodiments, the RPN may apply a translation invariant component to each of a plurality of points on the convolutional feature map to determine whether an object or part thereof is located at the point. In some embodiments, the transform invariant component may include a convolutional layer. In such embodiments, one or more convolutional layers of the RPN component may be shared with the proposal classifier located downstream in processing. Accordingly, the proposal classifier can benefit from the computation previously performed by the RPN, and the object detection and classification network can process images faster than previous network designs.

In addition, the RPN components may include anchors related to scale and aspect ratio. In at least one embodiment, the anchors may have three different aspect ratios (e.g., 1:1, 2:1, 1:2) and three different scales (e.g., scales with box areas of $128^2$, $256^2$ and $512^2$), so the total number of k=9 anchors may be included. In other embodiments, in the case of the cascade RPN, the number of anchors k may be one per point.

In various embodiments, the RPN may use Non Maximum Suppression (NMS) to determine which anchors can provide a basis for each proposal. In such embodiments, the RPN may take the anchor with the highest objectness score (e.g., the highest IoU overlap ratio) at a specific point and suppress all other anchors at that specific point. In addition, the RPN may suppress other anchors that overlap significantly with the highest scoring anchor but have low objectness scores. Accordingly, the RPN can reduce the number of anchors used to determine the proposal and the number of anchors output to the proposal classifier. In various embodiments, the maximum number of unsuppressed anchors may be 300 anchors. In another embodiment, the maximum number of unsuppressed anchors may be more or less.

At block 808, the computer system may input the convolutional feature map along with the proposals into the proposal classifier. In various embodiments, the proposal classifier may be a proposal classifier of a fast domain-based convolutional neural network (FRCN). In other embodiments, the proposal classifier may be combined with a region-based convolutional neural network (R-CNN) or other type of neural network.

In various embodiments, the proposal classifier may evaluate each proposal in the convolutional feature map and determine the category (e.g., class, type, etc.) of each object in the proposal. In some embodiments, the proposal classifier may determine the object category by comparing the object to pre-specified objects in a network such as FRCN. In some embodiments, when the proposal classifier does not recognize the category, it may designate the proposal as a background.

In various embodiments, the proposal classifier may generate a confidence score for a proposal. In various embodiments, the confidence score is a measure of how confident the proposal classifier is that an object falls into a determined category. In such embodiments, the confidence score may be based on the similarity of a feature (e.g., object curve, size, aspect ratio, angle, or other characteristic of the object) between the candidate object of the proposal and the pre-specified object. In some embodiments, the confidence score may be calculated for each proposal. In another embodiment, the confidence score may be calculated for each proposal, excluding those designated as background.

At block 810, the computer system may output an image having the classification and/or the confidence score determined at block 808.

The cascade RPN generates a proposal including an anchor box with a confidence score on the convolutional feature map by the following algorithm.

22

Algorithm 1
Cascade RPN
1 Input: sequence of regressors $f^\tau$, classifier g, feature x of image I.
2 Output: proposal set P.
3 Uniformly initialize anchor set $A^1=\{a^1\}$ over image I.
4 for $\tau\leftarrow1$ to T do
5 Compute offset $o^\tau$ of input anchor $\alpha^\tau$ on feature map using 7.
6 Compute regression prediction $\delta^\tau=f^\tau (x, o^\tau)$.
7 Compute regressed anchor $a^{\tau+1}$ from $\delta^\tau$ using 3.
8 end
9 Compute objectness score $s=g(x, o^\tau)$.
10 Derive proposals P from $A^{\tau+1}=\{a^{\tau+1}\}$ and $S=\{s\}$ using NMS 4.

Referring to Algorithm 1, the anchors established in the first stage A1 are uniformly initialized across the image. In the t stage, the anchor offset $o^\tau$ is calculated and fed into the regressor $f^\tau$ to generate the regression prediction. The prediction $\delta$ is used to generate the regression anchor $a^{\tau+1}$. At the final stage t, the objectness score is derived from the classifier and then generates a region proposal by NMS.

The method of generating a proposal by the cascade RPN according to one embodiment of the present disclosure will be described in more detail with reference to Algorithm 1 and FIG. 6.

The neural network generates a first convolutional feature map convoluted from the input image as a backbone and provides it to the cascade RPN.

The cascade RPN converts the first convolutional feature map into a second convolutional feature map by a first convolution and generates a first anchor for each point of the input image.

The Cascade RPN determines whether the first anchor is within the ground truth box.

The cascade RPN scales and shifts the first anchor within the ground truth box to generate a second anchor on the second convolutional feature map.

The cascade RPN convolves the second convolutional feature map by a second convolution to generate a third convolutional feature map.

The cascade RPN determines whether the overlap ratio between the ground truth box and the second single anchor is greater than or equal to a reference value, and scales and shifts the second anchor having an overlap ratio greater than or equal to the reference value to generate a third anchor.

The cascade RPN assigns an objectness score to the third anchor. The third anchor whose objectness score is equal to or greater than the reference value at each point is proposed on the third convolutional feature map.

In this case, the RPN identifies candidate objects at each point based on the objectness score. Here, the first convolution may be dilated convolution and the second convolution may be adaptive convolution.

In addition, the cascade RPN convolves the third convolutional feature map by the third convolution to generate a fourth convolutional feature map, and determines whether the overlap ratio between the ground true box and the third single anchor is greater than or equal to a reference value.

In this case, the cascade RPN generates a fourth anchor by scaling and shifting the third anchor whose overlap ratio is equal to or greater than the reference value, and assigns objectness scores to the fourth anchors, so that the cascade RPN may propose the fourth anchor whose objectness score is equal to or greater than the reference value as a proposal on the fourth convolutional feature map.

In other words, the cascade RPN can propose an anchor by scaling and shifting the anchor not only by convolution of two stages but also by convolution of two or more stages.

FIG. 9 is a flowchart illustrating a process flow 700 for training a model to detect and classify objects in images. As described in FIG. 5, the computer system may detect and classify objects in an image using machine learning techniques. The term "machine learning" may refer to one or more programs that learn from received data. For example, a machine learning mechanism may build, change, or otherwise use a model generated from example inputs, and the machine learning mechanism may use the model to make predictions or decisions. In this embodiment, the machine learning may be used to improve detection and classification of images. This model can be trained using supervised and/or unsupervised learning. For example, as the machine learning mechanism receives more training images, object classification may be updated based on training image data.

In various embodiments, training may be completed once upon system initialization. In some embodiments, the computer system may update training at periodic intervals (e.g., annually, monthly, weekly, etc.). In some embodiments, the computer system may update training when directed, for example, by a program manager. In this example, commands to update training may be via a network interface and/or an I/O interface.

In some embodiments, training may be completed while the computer system is in an online and/or offline mode. In some embodiments, the computer system may receive training images and object data (e.g., object category, position, number, etc.) corresponding to the training images from a source. In some embodiments, the computer system may receive training images and corresponding object data directly from a user device. The computer system may store the training images and corresponding data in a data store, for example.

In various embodiments, the RPN 500 may be trained end-to-end by backpropagation and stochastic gradient descent (SGD). The SGD is just an example algorithm that the machine learning module can apply along with backpropagation to train a model for object detection and classification optimization. Another embodiment may use a limited memory Broyden-Fletcher-Goldfarb-Shanno (BFGS) algorithm, an Orthant-wise Limited-memory quasi-Newton (OWL-QN) algorithm, or other algorithms for candidate object proposal optimization.

At block 902, the computer system may initialize one or more parameters in the network. In various embodiments, the computer system may initialize the Deep CNN, RPN and FRCN proposal classifier with parameters from a pre-trained model, such as an ImageNet pre-trained model.

At block 904, the computer system may train the Deep CNN and RPN together with a $CRPN_1$ model configured to generate an image proposal on a convolutional feature map. The training of the RPN has been described in detail above with reference to FIG. 5. In some embodiments, the training may adjust one or more parameters of the Deep CNN and/or RPN.

At block 906, the computer system may generate an object proposal to a convolutional feature map using the training image with the $CRPN_1$ model.

At block 908, the computer system may input the proposal generated at block 906 and train the FRCN proposal classifier. As an illustrative example, the output learning model may be referred to as $CRPNO_1$.

At block 910, the computer system may reinitialize the network with one or more parameters of the $CRPNO_1$ model. In various embodiments, the computer system may freeze the convolutional layers of the $CRPNO_1$ model. In such embodiments, the convolutional layer does not change across the network. In addition, the computer system may freeze the RPN parameters during reinitialization of the FRCN proposal classifier.

At block 912, the computer system may generate a second model, $CRPN_2$, by training the Deep CNN and the RPN together to generate a proposal.

At block 914, the computer system may generate an object proposal using the training images using the $CRPN_2$ model.

At block 916, the computer system may input the proposal generated at block 914 and train the FRCN proposal classifier. As an illustrative example, the output final model may be referred to as $CRPNO_2$.

All of the methods and processes described above may be implemented and fully automated as software code modules executed by one or more general purpose computers or processors. The code modules may be stored on any type of computer-readable storage medium or other computer storage device. Some or all of the methods may be implemented with specialized computer hardware.

Any routine descriptions, elements or blocks of the flowcharts described herein and/or shown in the accompanying drawings should be understood as potentially indicating codes, modules, segments or portions containing one or more executable instructions for implementing a particular logical function or element. Alternative examples are included within the scope of the examples described herein, in which elements or functions may be deleted or executed in order from those shown or discussed, either substantially synchronously or in reverse order, depending on the function to be understood herein.

It should be understood that many variations and modifications may be made to the above-described embodiments, and that elements are only one of other permissible examples. All such modifications and variations are intended to be included within the scope of the present disclosure and protected by the following claims. The embodiments according to the present disclosure described above may be implemented in the form of program instructions that can be executed through various computer components and recorded on a computer-readable recording medium. The computer-readable recording medium may include program instructions, data files, data structures, etc. alone or in combination. The program instructions recorded on the computer-readable recording medium may be specially designed and configured for the present disclosure, or may be known and usable to those skilled in the art of computer software. Examples of the computer-readable recording medium include magnetic media such as hard disks, floppy disks and magnetic tapes, optical recording media such as CD-ROMs and DVDs, and magneto-optical media such as floptical disks, and hardware devices specially configured to store and execute program instructions, such as ROM, RAM, flash memory, and the like. Examples of the program instructions include high-level language codes that can be executed by a computer using an interpreter or the like as well as machine language codes generated by a compiler. The hardware device may be configured to act as one or more software modules to perform processing according to the present disclosure and vice versa.

Although the present disclosure has been described above by specific details such as specific components and limited embodiments and drawings, these are provided to help a more general understanding of the present disclosure, and the present disclosure is not limited to the above embodiments. Moreover, those skilled in the art to which the present disclosure pertains may seek various modifications and variations from these descriptions.

Accordingly, the idea of the present disclosure should not be limited to the above-described embodiments, and not only the claims to be described later, but also all modifications equivalent or equivalent to the claims are regarded to belong to the scope of the idea of the present disclosure.

INDUSTRIAL APPLICABILITY

The method and system for detecting and classifying objects in an image according to the present disclosure reduce the number of anchor boxes by using one anchor for each point, thereby increasing the speed of the neural network and the accuracy of object recognition. Accordingly, It can contribute to technology improvement in the field of object detection and classification on an image.

What is claimed is:

1. A method comprising:
receiving an input image and generating a first convolutional feature map;
converting the first convolutional feature map into a second convolutional feature map by a first convolution;
generating a first anchor for each point of the input image;
determining whether the first anchor is within a ground truth box;
generating a second anchor on the second convolutional feature map by scaling and shifting the first anchor within the ground truth box;
generating a third convolutional feature map by convolving the second convolutional feature map by a second convolution;
determining whether an overlap ratio between the ground truth box and the second single anchor is greater than or equal to a reference value;
generating a third anchor by scaling and shifting the second anchor having an overlap ratio greater than or equal to the reference value;
assigning an objectness score to the third anchor;
proposing the third anchor having an objectness score equal to or greater than a reference value as a proposal on the third convolutional feature map;
generating a fourth convolutional feature map by convolving the third convolutional feature map by a third convolution;
determining whether an overlapping ratio between the ground truth box and the third single anchor is greater than or equal to a reference value;
generating a fourth anchor by scaling and shifting the third anchor having the overlapping ratio greater than or equal to the reference value;
assigning an objectness score to the fourth anchor; and
proposing the fourth anchor having the objectness score equal to or greater than a reference value as a proposal on the fourth convolutional feature map.

2. The method of claim 1, further comprising identifying a candidate object at the point based on the objectness score.

3. The method of claim 2, further comprising:
determining a category of the candidate object; and
assigning a confidence score to the category of the candidate object.

4. The method of claim 1, wherein the first convolution is a dilated convolution.

5. The method of claim 1, wherein the second convolution is an adaptive convolution.

6. A system comprising:
a processor; and
a computer-readable medium including instructions for executing an object detection and classification network by the processor,
wherein the object detection and classification network includes an initial processing module configured to input an image and generate a convolutional feature map, and an object proposal module configured to generate a proposal corresponding to a candidate object in the image, and
wherein the object proposal module performs:
converting a first convolutional feature map into a second convolutional feature map by a first convolution;
generating a first anchor for each point of the input image;
determining whether the first anchor is within a ground truth box;
generating a second anchor on the second convolutional feature map by scaling and shifting the first anchor within the ground truth box;
generating a third convolutional feature map by convolving the second convolutional feature map by a second convolution;
determining whether an overlap ratio between the ground truth box and the second single anchor is greater than or equal to a reference value;
generating a third anchor by scaling and shifting the second anchor having an overlap ratio greater than or equal to the reference value;
assigning an objectness score to the third anchor;
proposing the third anchor having an objectness score equal to or greater than a reference value as a proposal on the third convolutional feature map;
generating a fourth convolutional feature map by convolving the third convolutional feature map by a third convolution;
determining whether an overlapping ratio between the ground truth box and the third single anchor is greater than or equal to a reference value;
generating a fourth anchor by scaling and shifting the third anchor having the overlapping ratio greater than or equal to the reference value;
assigning an objectness score to the fourth anchor; and
proposing the fourth anchor having the objectness score equal to or greater than a reference value as a proposal on the fourth convolutional feature map.

7. The system of claim 6, wherein the first convolution is a dilated convolution.

8. The system of claim 6, wherein the second convolution is an adaptive convolution.

9. The system of claim 6, wherein the object proposal module performs identifying the candidate object at the point based on the objectness score.

10. The system of claim 6, further comprising a proposal classifier for determining a category of the candidate object and assigning a confidence score to the category of the candidate object.

11. A system comprising:
a processor; and
a computer-readable medium including instructions for executing an object detection and classification network by the processor,
wherein the object detection and classification network includes an initial processing module configured to input an image and generate a convolutional feature map, and an object proposal module configured to generate a proposal corresponding to a candidate object in the image, and wherein the object proposal module performs:

converting a first convolutional feature map into a second convolutional feature map by a first convolution;

generating a first anchor for each point of the input image;

determining whether the first anchor is within a ground truth box;

generating a second anchor on the second convolutional feature map by scaling and shifting the first anchor within the ground truth box;

generating a third convolutional feature map by convolving the second convolutional feature map by a second convolution;

determining whether an overlap ratio between the ground truth box and the second single anchor is greater than or equal to a reference value;

generating a third anchor by scaling and shifting the second anchor having an overlap ratio greater than or equal to the reference value;

assigning an objectness score to the third anchor; and proposing the third anchor having an objectness score equal to or greater than a reference value as a proposal on the third convolutional feature map, further comprising a proposal classifier for determining a category of the candidate object and assigning a confidence score to the category of the candidate object, further comprising a machine learning module for training at least one parameter of the initial processing module and the object proposal module to generate at least one proposal on a training image, and training at least one parameter of the proposal classifier module to assign a category to each of the at least one proposal on the training image.

* * * * *